United States Patent
Zheng et al.

(10) Patent No.: US 12,000,959 B2
(45) Date of Patent: Jun. 4, 2024

(54) PROXIMITY SENSOR AND ELECTRONIC DEVICE HAVING THE SAME

(71) Applicant: LITE-ON SINGAPORE PTE. LTD., Singapore (SG)

(72) Inventors: Rui-Tao Zheng, Singapore (SG); Wei Jian Jenson Neo, Singapore (SG); Teck-Chai Goh, Singapore (SG); Yu-Hsien Liu, Taipei (TW)

(73) Assignee: LITE-ON SINGAPORE PTE. LTD., Singapore (SG)

( * ) Notice: Subject to any disclaimer, the term of this patent is extended or adjusted under 35 U.S.C. 154(b) by 87 days.

(21) Appl. No.: 17/509,147

(22) Filed: Oct. 25, 2021

(65) Prior Publication Data
US 2022/0043123 A1 Feb. 10, 2022

Related U.S. Application Data

(63) Continuation-in-part of application No. 16/436,174, filed on Jun. 10, 2019, now abandoned.

(30) Foreign Application Priority Data

Nov. 14, 2018 (CN) .......................... 201821877955.5

(51) Int. Cl.
*G01S 7/481* (2006.01)
(52) U.S. Cl.
CPC ................... *G01S 7/4813* (2013.01)
(58) Field of Classification Search
CPC ............................. G01S 7/4813; G01S 17/04
See application file for complete search history.

(56) References Cited

U.S. PATENT DOCUMENTS

| 7,026,654 | B2* | 4/2006 | Igaki | H01L 31/02325 257/E31.096 |
| 10,359,300 | B2* | 7/2019 | Chung | G01D 5/30 |
| 2006/0016994 | A1* | 1/2006 | Basoor | G01V 8/12 250/338.1 |
| 2006/0097051 | A1* | 5/2006 | Foo | G01D 5/34715 235/454 |
| 2007/0241943 | A1* | 10/2007 | Tan | G01D 5/34715 341/50 |

(Continued)

FOREIGN PATENT DOCUMENTS

WO WO-2020234324 A1 * 11/2020 ............. G01S 17/04

*Primary Examiner* — Marcus H Taningco
(74) *Attorney, Agent, or Firm* — Li & Cai Intellectual Property (USA) Office (57) ABSTRACT

A proximity sensor includes a substrate, an emitting unit, a receiving unit, a packaging unit and an isolating unit. The emitting unit is disposed on an emitting region of the substrate. The receiving unit is disposed on a receiving region of the substrate. The packaging unit includes a first package body and a second package body. The first package body covers the emitting unit, and the second package body covers the receiving unit. The isolating unit is disposed between the first package body and the second package body. The first package body has a first top surface and a first side surface connected to the first top surface. The light can be emitted out the first top surface or the first side surface, respectively received by a second side surface or the second top surface of the second package body, and detected by the receiving unit.

20 Claims, 7 Drawing Sheets

(56) References Cited

U.S. PATENT DOCUMENTS

| | | | | |
|---|---|---|---|---|
| 2007/0246645 | A1* | 10/2007 | Wong | G01D 5/34707 |
| | | | | 250/231.13 |
| 2010/0155586 | A1* | 6/2010 | Chin | G01D 5/34715 |
| | | | | 250/231.1 |
| 2011/0061340 | A1* | 3/2011 | Lim | G01D 11/245 |
| | | | | 53/396 |
| 2012/0133956 | A1* | 5/2012 | Findlay | H03K 17/941 |
| | | | | 257/E31.127 |
| 2012/0176760 | A1* | 7/2012 | Cohen | H04M 1/026 |
| | | | | 361/807 |
| 2013/0019459 | A1* | 1/2013 | Lim | H03K 17/941 |
| | | | | 29/592.1 |
| 2015/0323670 | A1* | 11/2015 | Shirasaka | G01J 1/0411 |
| | | | | 250/206.1 |
| 2016/0061653 | A1* | 3/2016 | Chang | H01L 25/167 |
| | | | | 250/237 R |
| 2016/0259056 | A1* | 9/2016 | Heng | G01S 17/08 |
| 2017/0160427 | A1* | 6/2017 | Costello | G06F 1/1658 |
| 2017/0284864 | A1* | 10/2017 | Chen | G01J 1/0214 |
| 2018/0114875 | A1* | 4/2018 | Ho | H01L 31/143 |
| 2019/0378863 | A1* | 12/2019 | Chou | H01L 27/1464 |
| 2020/0256990 | A1* | 8/2020 | Uedaira | H03K 17/945 |
| 2022/0244380 | A1* | 8/2022 | Warren | G01S 17/04 |

\* cited by examiner

PROXIMITY SENSOR AND ELECTRONIC DEVICE HAVING THE SAME

CROSS-REFERENCE TO RELATED PATENT APPLICATION

This application is a Continuation-in-Part of application Ser. No. 16/436,174, filed Jun. 10, 2019, now pending, which claimed the benefit of priority to China Patent Application No. 201821877955.5, filed on Nov. 14, 2018 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a proximity sensor, and more particularly to an infrared proximity sensor which can avoid crosstalk.

BACKGROUND OF THE DISCLOSURE

A proximity sensor refers to a sensor for detecting the distance of an object. A common example of the use of the proximity sensor is being employed in a smart phone to avoid mistouches on a touch screen when speaking on the phone. The working principle of the proximity sensor is emitting an electromagnetic field or light beam and analyzing a change by a receiving unit so as to determine the proximity or presence of an object.

Since the touch screen is becoming larger and an edge frame of the touch screen is becoming narrower, the space for installation of components in the conventional smart phone has decreased. The touch screen is currently provided with an ambient light sensor which cooperates with the proximity sensor. The ambient light sensor is configured to adjust the brightness of the touch screen, so that the brightness of the touch screen can be changed according to changes in ambient light levels so as to achieve the effects of energy saving and eye protection. The proximity sensor is configured to detect whether an object is in front of the touch screen.

The conventional proximity sensor is provided with a shielding case to eliminate interference of external lights such as lamplight and sunlight, so as to avoid crosstalk. However, the proximity sensor with the shielding case cannot decrease in volume or thickness. Therefore, in order to meet the requirements of current smart phones, reducing the volume or thickness of the proximity sensor has become one of the important issues to be solved.

SUMMARY OF THE DISCLOSURE

In response to the above-referenced technical inadequacies, the present disclosure provides a proximity sensor which can avoid crosstalk without a shielding case.

In one aspect, the present disclosure provides a sensor which includes a substrate, an emitting unit, a receiving unit, a packaging unit and an isolating unit. The substrate has a supporting surface. The supporting surface having an emitting region and a receiving region corresponding in position to the emitting region. The emitting unit is disposed on the emitting region. The receiving unit is disposed on the receiving region. The first package body covers on the emitting unit. The first package body has a first side surface respect to the receiving unit. The second package body covers on the receiving unit. The second package body has a second side surface respect to the emitting unit, and a part of the second side surface is formed as a curved shaped surface. The isolating unit formed between the first package body and the second package body.

In another aspect, the present disclosure also provides an electronic device including the sensor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
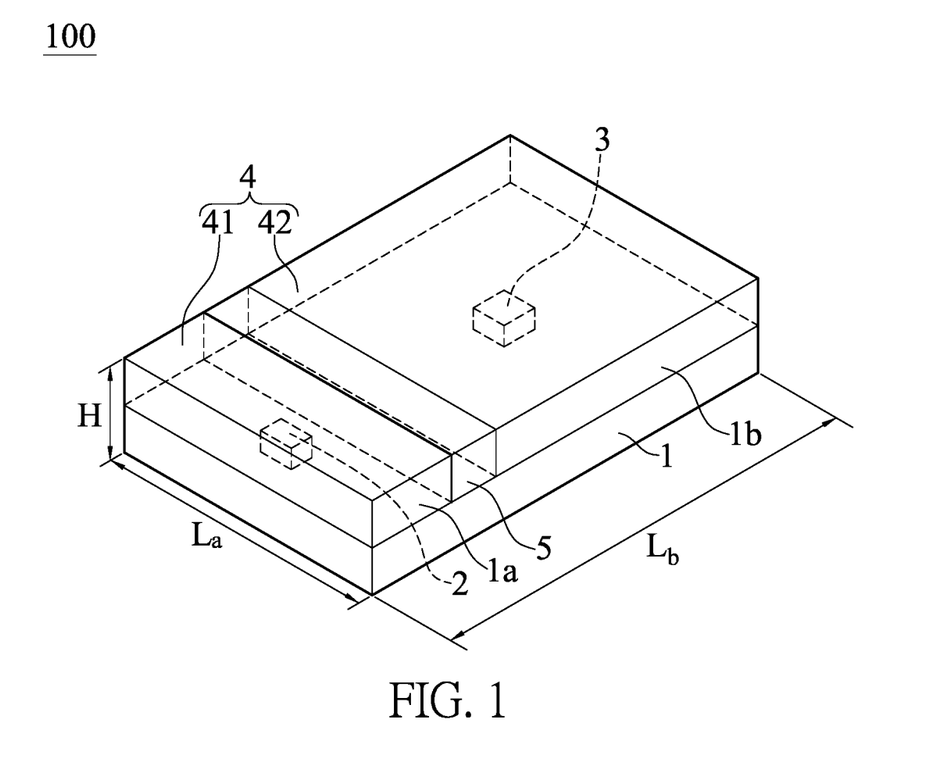
FIG. 1 is a schematic view of an infrared proximity sensor of the present disclosure.

Referring to FIG. 1, a schematic view of an infrared proximity sensor according to an exemplary embodiment of the present disclosure is provided. The infrared proximity sensor 100 includes a substrate 1, an emitting unit 2, a receiving unit 3, a packaging unit 4 and an isolating unit 5.

The substrate 1 has a supporting surface and the supporting surface has an emitting region 1a and a receiving region 1b corresponding in position to the emitting region 1a. The substrate 1 can be a common PCB, but is not limited thereto. More specifically, the emitting region 1a is located near, but not connected to, the receiving region 1b. The substrate 1 has a first side $L_a$ and a second side $L_b$. The substrate 1 is cuboid in shape, in which the first side $L_a$ is a short side and the second side $L_b$ is a long side, and the first side $L_a$ has a length less than 1.5 mm. Furthermore, the total thickness H of the substrate 1 and the packaging unit 4 is between 0.7 mm and 1.0 mm.

The emitting unit 2 is disposed on the emitting region 1a. The receiving unit 3 is disposed on the receiving region 1b. Furthermore, the substrate 1 can be provided with a control circuit (not shown) for controlling the operation of the emitting unit 2 and the receiving unit 3.

More specifically, the emitting unit 2 can be a vertical cavity surface emitting laser (VCSEL). The receiving unit 3 can be an ambient light sensor (ALS), an RGB sensor, or the combination thereof.

Figure 2:
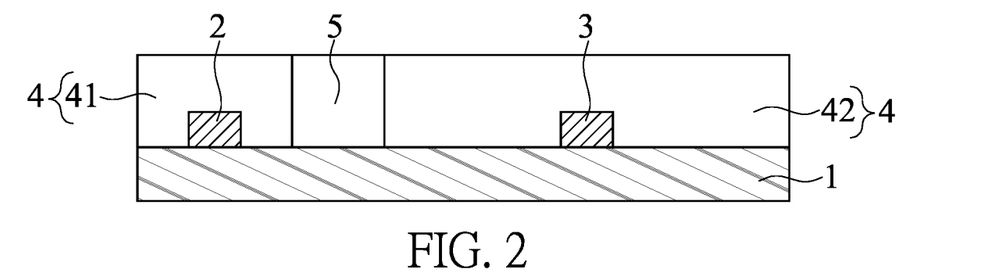
FIG. 2 is a side sectional view of the infrared proximity sensor of the present disclosure.

The packaging unit 4 includes a first package body 41 and a second package body 42. The first package body 41 covers the emitting unit 2, and the second package body 42 covers the receiving unit 3. The top end of the first package body 41 has a light output surface, the top end of the second package body 42 has a light input surface, and the light output surface of the first package body 41 and the light input surface of the second package body 42 are exposed to an exterior environment. The first package body 41 and the second package body 42 can be made of a transparent packaging material. In a certain embodiment of the present disclosure, the transparent packaging material can be an infrared-shielding compound with a transmittance between 60% and 80% at 940 nm. Accordingly, crosstalk in the packaging material due to internal reflection and scattering can be prevented. The transparent packaging material can be a glass, epoxy, silicone, urea resin, or acrylic resin system, but is not limited thereto. In practice, the light output surface of the first package body 41 can be an aspheric surface, cambered surface, parabolic surface, hyperbolic surface, or free-form surface so as to increase the light intensity of the emitting unit 2. The isolating unit 5 as shown in FIG. 2, which is a side sectional view according to a certain embodiment of the present disclosure, is disposed between the first package body 41 and the second package body 42. Therefore, the emitting region 1a is located near, but not connected to, the receiving region 1b.

Figure 3A:
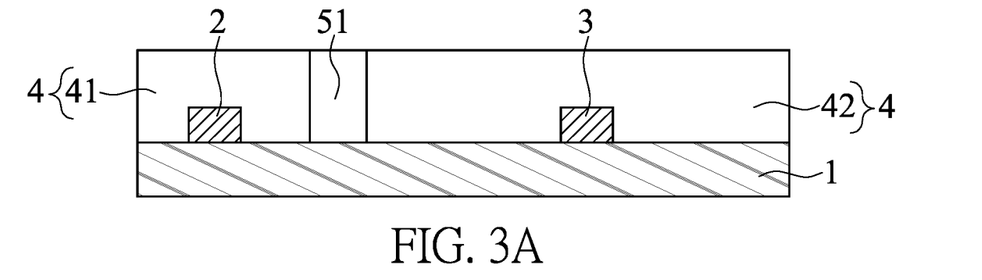
FIG. 3A is a side sectional view of the infrared proximity sensor according to an embodiment of the present disclosure.

In another embodiment of the present disclosure, the isolating unit 5 as shown in FIG. 3A can include a shielding layer 51. The shielding layer 51 is made of a non-transparent material which can be selected from plastics and metals such as copper, aluminum, silver, gold, or the combination thereof, but is not limited thereto. More specifically, the shielding layer 51 can be disposed on the substrate 1 such that the emitting region 1a is in proximity to the receiving region 1b, rather than adjoining to the receiving region 1b.

Figure 3B:
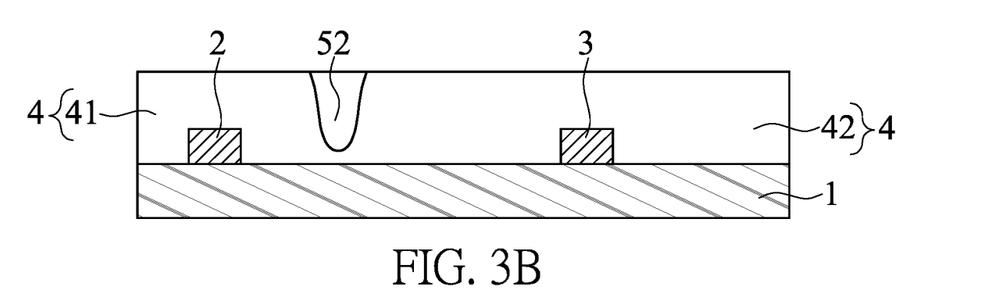
FIG. 3B is a side sectional view of the infrared proximity sensor according to another embodiment of the present disclosure.

In an embodiment of the present disclosure, the isolating unit 5 can include an air groove 52, and the air groove 52 is a U-shaped or V-shaped groove. FIG. 3B shows an implementation of the air groove 52 which is a U-shaped groove. More specifically, the air groove 52 does not extend to the substrate 1 in depth, thereby having a better mechanical strength. More specifically, the U-shaped groove has a second part with a diameter less than 1 mm.

Figure 3C:
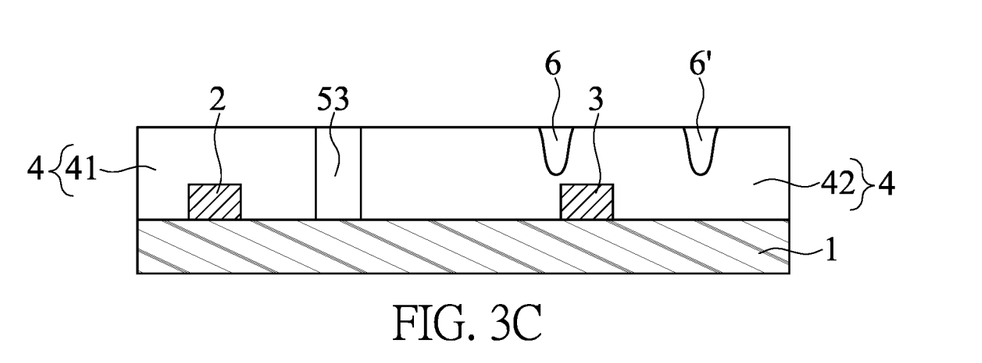
FIG. 3C is a side sectional view of the infrared proximity sensor according to still another embodiment of the present disclosure.
Figure 3D:
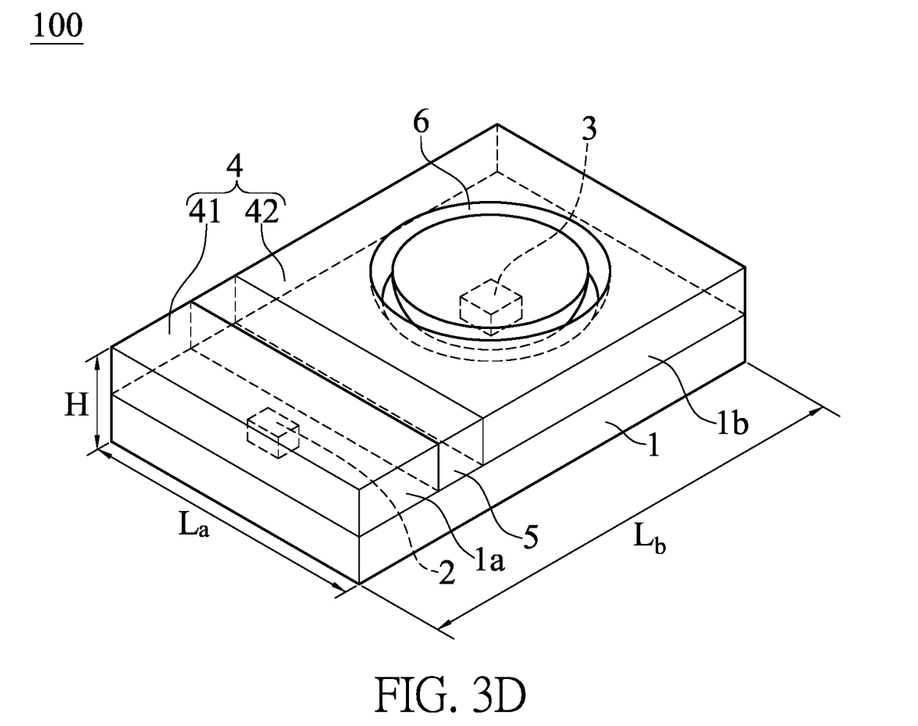
FIG. 3D is a perspective view of the infrared proximity sensor according to the embodiment depicted by FIG. 3C of the present disclosure.

In still another embodiment of the present disclosure, the isolating unit 5 as shown in FIG. 3C can include an encapsulant layer 53 which is made of the same material as the first package body 41 and the second package body 42. Furthermore, the second package body 42 further includes a circular trench 6 surrounding the receiving unit 3. The circular trench 6(6') as shown in FIG. 3D, which is a perspective view according to the same embodiment as FIG. 3C, surrounds the receiving unit 3. More specifically, the circular trench 6 is a U-shaped trench surrounding the receiving unit 3.

The conventional proximity sensor mainly uses an additional shielding case to avoid crosstalk between the emitting unit and the receiving unit, and to shield from exterior interferences. However, the shielding case having a thickness of about 100 mm cannot reduce the spacing between the emitting region and the receiving region and the size of the proximity sensor. In contrast, the infrared proximity sensor 100 of the present disclosure omits the shielding case and thus has a reduced size. Therefore, the first side $L_a$ of the substrate 1 has a length less than 1.5 mm, and preferably less than 1.44 mm. The total thickness of the substrate 1 and the packaging unit 4 is between 0.7 mm and 1.0 mm, preferably 0.7 mm.

Fifth Embodiment

Figure 4:
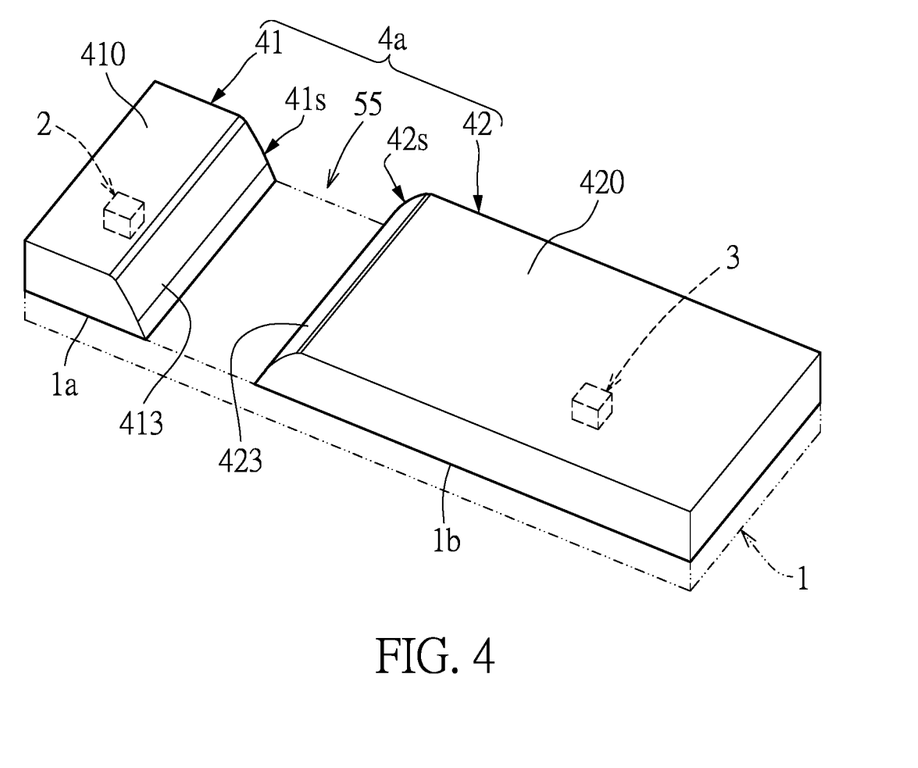
FIG. 4 is a perspective view of the proximity sensor of a fifth embodiment of the present disclosure.

Referring to FIG. 4, a perspective view of the proximity sensor of a fifth embodiment is developed from FIG. 3B. The proximity sensor, or shortly as "sensor" includes a substrate 1, an emitting unit 2, a receiving unit 3, and a packaging unit 4. The packaging unit 4 includes a first package body 41, and a second package body 42. Similar to FIG. 3B, an isolating unit 55 is formed between the first package body 41 and the second package body 42, and it can be an air groove 52 in this embodiment.

The substrate 1 has a supporting surface. The supporting surface has an emitting region 1a and a receiving region 1b corresponding in position to the emitting region 1a. The emitting unit 2 is disposed on the emitting region 1a. The receiving unit 3 is disposed on the receiving region 1b. In this embodiment, the emitting unit 2 can be a laser diode, especially as a vertical cavity surface emitting laser (VCSEL). The receiving unit 3 can be a photodiode, especially as an ambient light sensor (ALS) or an RGB sensor.

Figure 6:
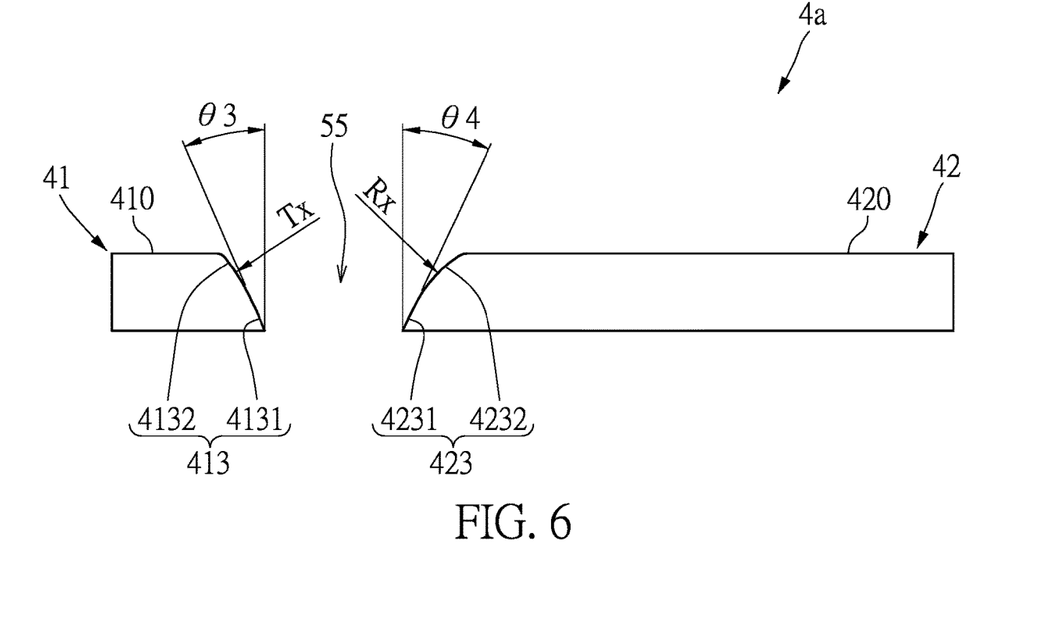
FIG. 6 is another side view of the proximity sensor of the fifth embodiment of the present disclosure.

The first package body 41 covers on the emitting unit 2. The first package body 41 has a first top surface 410 and a first side surface 413 connected to the first top surface 410 and respect to the receiving unit 3. In this embodiment, the first side surface 413 is formed as a curved shape. The first package body 41 has an emitting lens 41S which is formed on the first side surface 413 and has a radius Tx, as shown in FIG. 6.

The second package body 42 covers on the receiving unit 3. The second package body 42 has a second top surface 420 and a second side surface 423. The second package body 42 and the first package body 41 are horizontally separated on the substrate 1 by the isolating unit 55, wherein the second side surface 423 faced the first side surface 413 of the first package body 41. A receiving lens 42S formed on the second side surface 423 has a radius Rx, as shown in FIG. 6.

However, the present disclosure is not limited thereto, the first side surface 413 and the second side surface 423 can be formed with at least one curved-shaped portion, or the entire surface is curved shaped. And the isolating unit 55 is a U-shaped air groove complement with a profile of the first side surface 413 and a profile of the second side surface 423.

Figure 5:
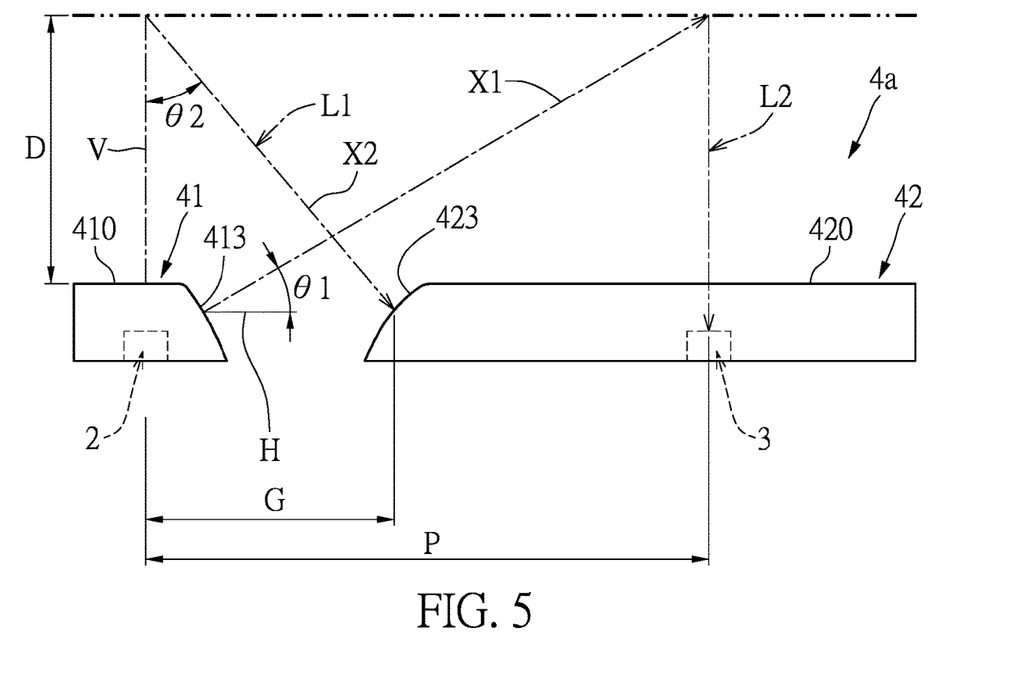
FIG. 5 is a side view of the proximity sensor of the fifth embodiment of the present disclosure.

Reference is made to FIG. 5, which is a side view of the proximity sensor. This embodiment can detect light at least in two different ways, which are a first light L1 and a second light L2. The first light L1 is emitted from the emitting unit 2 and out of the first top surface 410. After the first light L1 is reflected by a detected object 92, the first light L1 can enter second side surface 423 and is transmitted within the second package body 42 by a total internal reflection. Finally, the first light L1 is received by the receiving unit 3. In addition, the second light L2 is emitted from the emitting unit 2 and out of the first side surface 413. After the second light L2 is reflected by the detected object 92, the second light L2 enters the second package body 42 from the first top surface 410, and finally detected by the receiving unit 3. In a preferred embodiment, the first top surface 410 of the first package body 41 is larger than the second top surface 420 of the second package body 42, and the isolating unit 55 is located nearer to the emitting unit 2 than the receiving unit 3.

Furthermore, the emitter lens 41S with an axis tilting angle θ1 between a lens axis X1 of the first side surface 413 of the first package body 41 and an horizontal line H is 35 degrees or less, preferably 20 to 30 degrees. The receiver lens 42S with an axis tilting angle θ2 between a lens axis X2 of the second side surface 423 of the second package body 42 and a vertical line V is 45 degrees or less, preferably 30 to 40 degrees.

The angle θ2 of the receiving lens 42S is defined as TA_Rx and is fulfilled as a formula (1) as follows, $$TA\_Rx \geq \sin^{-1}(1/N); \qquad \text{formula (1)}$$

wherein N is a refractive index of the second package body 42, such as a mold compound material. Further, a light is emitted out from the first package body 41 received by the curved part of the side receiving lens 42S with an incident angle which is larger than $\sin^{-1}(1/N)$. According to a practical embodiment, the material can be epoxy or silicone, and the value of N is between 1.4 to 1.6.

Reference is made to FIG. 5. The gap G between the emitting unit 41S and the receiving lens 42S is defined as G and is fulfilled as a formula (2) as follows, $$G = D/\tan TA\_Rx, \qquad \text{formula (2)}$$

wherein D is an object reflective distance between a detected object 92 and the emitting unit 2.

Figure 8:
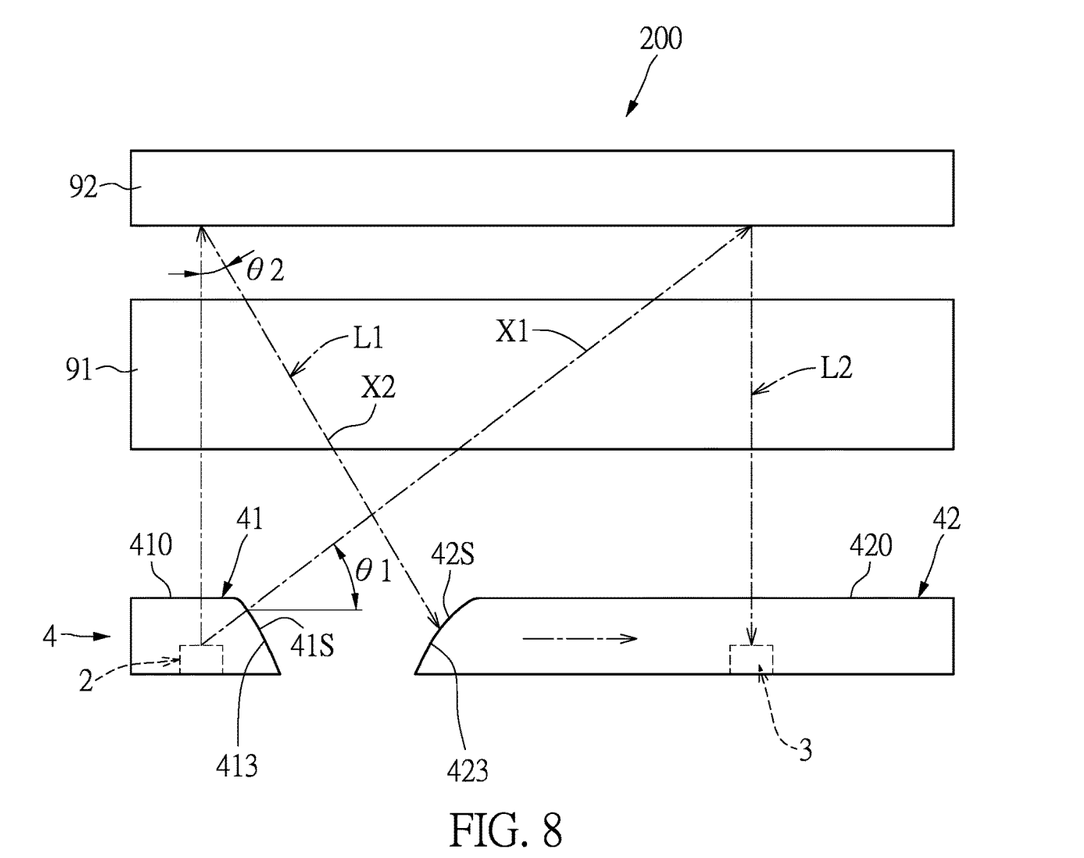
FIG. 8 is a side view of the proximity sensing device according to the present disclosure.

Reference is made to FIG. 8. A focal length of the receiving lens 42S is defined as F_Rx and is fulfilled as a formula (3) as follows, $$F\_Rx = (D + Tw(Nw-1))/\sin(TA\_Rx) \qquad \text{formula (3)}$$

wherein Tw is a thickness of the window unit 91; and is a refractive index of the window unit 91.

Reference is made to FIG. 5. In this embodiment, the angle θ1 of the emitting lens 41S is defined as TA_Tx and is fulfilled as a formula (4) as follows, $$TA\_Tx = \tan^{-1}(D/P) \qquad \text{formula (4)}$$

wherein P is a distance between the emitting unit 2 and the receiving unit 3.

A focal length of the emitting lens 41S is defined as F_Tx and is fulfilled as a formula (5) as follows, $$F\_Tx = (D + Tw(Nw-1))/\sin(TA\_Tx) \qquad \text{formula (5)}$$

In a preferable embodiment, the focal length of the emitting lens 41S is between 1.8 mm and a value of infinity, and the focal length of the receiving lens 42S is between 1.8 mm and a value of infinity.

In a preferable embodiment, a radius of the emitting lens 41S is 0.3 mm to a flat surface, and a radius of the receiving lens 42S is 0.3 mm to a flat surface.

In a preferable embodiment, a horizontal separation distance P between the emitting unit 2 and the receiving unit 3 is in a range of 1.5 mm to 3 mm, preferably in a range of 2 mm to 3 mm.

In a preferable embodiment, a center of curved part of the side receiving lens 42S is out of the second package body 42 and a center of curved part of the side emitting lens 41S is out of the first package body 41.

Reference is made with FIG. 6. The first side surface 413 adjacent to the isolating unit 55 has a first part 4131 and a second part 4132 connected to the first part 4131. The second part 4132 is also connected to the first top surface 410. The second side surface 423 adjacent to the isolating unit 55 has a first part 4231 and a second part 4232 connected to the first part 4231. The second part 4232 is also connected to the second top surface 420.

In addition, at least one of the first parts 4131, 4231 and the second parts 4132, 4232 is a curved shaped surface. In this embodiment, the first parts 4131 and 4231 are planar surface. The second parts 4132 and 4232 are curved shaped surfaces. For example, as the first part 4131, 4231 is sloped surface or perpendicular surface, and the second part 4132, 4232 is as a curved surface. The second part 4132 of the first side surface 413 has a radius Tx, and the second part 4232 of the second side surface 423 has a radius Rx. Furthermore, the bevel angle θ3 between the first part 4131 of the first package body 41 and an imaginary normal line with respect to the substrate 1 is 60 degrees or less, preferably 0 to 30 degrees. The bevel angle θ4 between the first part 4231 of the second package body 42 and an imaginary normal line with respect to the substrate 1 is 60 degrees or less, preferably 0 to 40 degrees.

Sixth Embodiment

Figure 7:
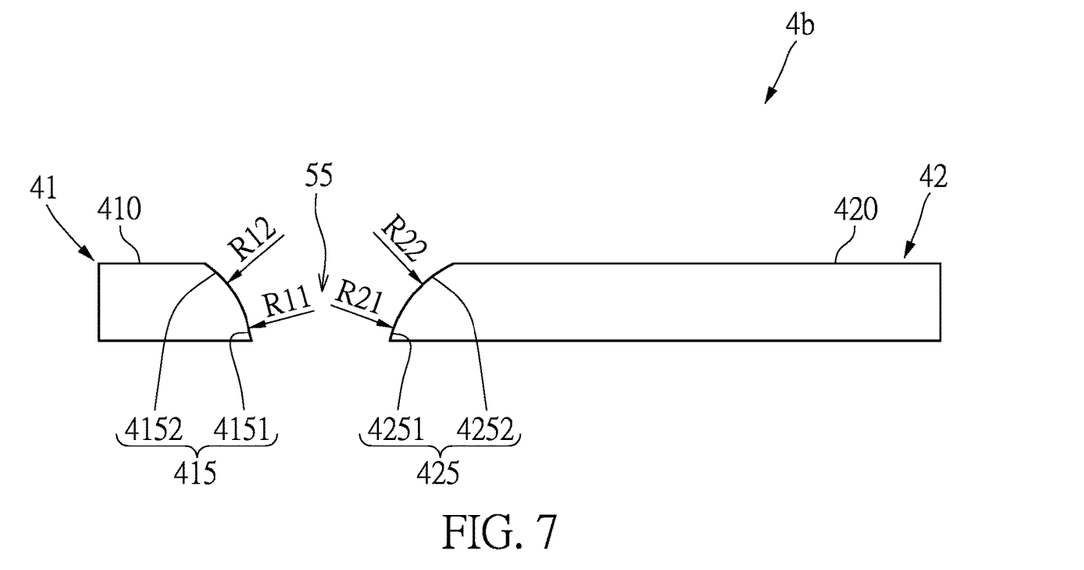
FIG. 7 is a side view of the proximity sensor of the sixth embodiment of the present disclosure.

Reference is made to FIG. 7, which is a side view of the proximity sensor of a sixth embodiment. In this embodiment, the first side surface 415 of the first package body 41 is totally a curved surface which has an upper second part 4152 with a radius R21, and a lower second part 4151 with a radius R11. In other words, the first side surface 415 forms an emitting lens. In this embodiment, the radius R12 is larger than the radius R11. However, the present disclosure is not limited thereto, the shapes of the first side surface 415 can be formed by two tangentially cascaded lens curve.

The second side surface 425 of the second package body 42 is totally curved-surfaced, which has an upper second part 4252 with a radius R22, and a lower second part 4251 with a radius R21. In other words, the second side surface 425 forms a receiving lens. In this embodiment, the radius R22 is larger than the radius R21. However, the present disclosure is not limited thereto, the shapes of the second side surface 425 can be formed by two tangentially cascaded lens curve.

For example, Radius 12, 22 of the upper second part 4152 and 4252 ranges from 0.3 to flat surface, and Radius 11, 21 of the lower second part 4151 and 4251 ranges from 0.1 to flat surface.

One of the advantages of the present disclosure is that the proximity sensor of the present disclosure, in which the isolating unit is disposed between the first package body and the second package body and the substrate has opposite first and second sides and the length of the first side is less than 1.5 mm, can omit the shielding case and thus has a reduced size. The first side of the substrate has a length less than 1.5 mm and the total thickness of the substrate and the packaging unit is between 0.7 mm and 1.0 mm. Furthermore, the crosstalk between the emitting unit and the receiving unit and exterior interference can be avoided.

Furthermore, the proximity sensor according to an embodiment of the present disclosure, in which the isolating unit is an air groove, can minimize the crosstalk caused by ambient lights and sidelights. The proximity sensor according to a certain embodiment of the present disclosure, in which the second package body further includes a circular trench surrounding the receiving unit, can effectively prevent interferences by shielding off the exterior light. The proximity sensor according to another embodiment of the present disclosure, in which at least one of the first package body and the second package body further includes a curved lens on side surface thereof, so that it is more sensitive to the object in the near-field. In detail, the curved lens of the first package body will help focus big angle emission rays to boost signal to improve emission efficiency, and the curved lens of the second package body will help collect big angle incidence light from objects to improve signal strength.

The packaging material of the present disclosure is an infrared-shielding compound with a transmittance between 60% and 80% at 940 nm, such that crosstalk in the packaging material due to internal reflection and scattering can be prevented. Therefore, the proximity sensor can have an improved accuracy and sensitivity.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensor, comprising:
 a substrate having a supporting surface, the supporting surface having an emitting region and a receiving region corresponding in position to the emitting region;
 an emitting unit disposed on the emitting region;
 a receiving unit disposed on the receiving region;
 a first package body covering on the emitting unit, the first package body having a first side surface respect to the receiving unit, and a first top surface connected to the first side surface;
 a second package body covering on the receiving unit, the second package body having a second side surface respect to the emitting unit, and a second top surface connected to the second side surface; wherein a side receiving lens with a curved part is formed on the second side surface, and a part of the second side surface is formed as a curved shaped surface, wherein a center of the curved part of the side receiving lens is out of the second package body; and
 an isolating unit formed between the first package body and the second package body.

2. The sensor according to claim 1, wherein a first light is emitted out the first top surface, received by the second side surface of the second package body, and transmitted within the second package body to the receiving unit;
 wherein a second light is emitted out the first side surface, received by the second top surface of the second package body, and detected by the receiving unit.

3. The sensor according to claim 2, wherein the first top surface of the first package body is larger than the second top surface of the second package body, and the isolating unit is located nearer to the emitting unit than the receiving unit.

4. The sensor according to claim 1, wherein another part of the second side surface adjacent to the substrate is formed as a curved shaped surface, and the radius of the part of the second side surface is larger than the radius of another part of the second side surface.

5. The sensor according to claim 1, wherein another part of the second side surface adjacent to the substrate is formed as a planar shaped surface, the planar shaped surface is connected with the curved shaped surface, and the planar shaped surface is perpendicular to or tilted related to the supporting surface of the substrate.

6. The sensor according to claim 1, wherein the first side surface is faced the second side surface of the second package body, and a part of the first side surface is formed as a curved shaped surface.

7. The sensor according to claim 6, wherein the isolating unit is a U-shaped air groove complement with a profile of the first side surface and a profile of the second side surface.

8. The sensor according to claim 6, wherein another part of the first side surface is formed as a planar shaped surface, the planar shaped surface is connected with the curved shaped surface, and the planar shaped surface is perpendicular to or tilted related to the supporting surface of the substrate.

9. The sensor according to claim 6, wherein another part of the first side surface adjacent to the substrate is formed as a curved shaped surface, and the radius of the part of the first side surface is larger than the radius of another part of the first side surface.

10. The sensor according to claim 1, wherein the first side surface is formed as a curved shape and is formed with an emitting lens, and wherein the second side surface is formed as a curved shape and is formed with a receiving lens.

11. The sensor according to claim 10, wherein a radius of the emitting lens is 0.3 mm to a flat surface, and a radius of the receiving lens is 0.3 mm to a flat surface.

12. The sensor according to claim 1, wherein a horizontal separation distance between the emitting unit and the receiving unit is in a range of 1.5 mm to 3 mm.

13. The sensor according to claim 1, wherein the emitting unit is a vertical cavity surface emitting laser (VCSEL) and the receiving unit is an ambient light sensor (ALS) or an RGB sensor.

14. An electronic device comprising the sensor of claim 1.

15. A sensor, comprising:
a substrate having a supporting surface, the supporting surface having an emitting region and a receiving region corresponding in position to the emitting region;
an emitting unit disposed on the emitting region;
a receiving unit disposed on the receiving region;
a first package body covering on the emitting unit, the first package body having a side emitting lens with a curved part;
a second package body covering on the receiving unit, the second package body having a second side surface respect to the emitting unit, and a second top surface connected to the second side surface; wherein a side receiving lens with a curved part is formed on the second side surface; and
an isolating unit formed between the first package body and the second package body;
wherein a center of the curved part of the side receiving lens is out of the second package body.

16. The sensor according to claim 15, wherein the isolating unit is a U-shaped air groove complement with the profile formed by the first package and the second package.

17. The sensor according to claim 15, wherein a light is emitted out from the first package body, received by the curved part of the side receiving lens with an incident angle which is larger than $\sin^{-1}(1/N)$; wherein N is a refractive index of the second package body;
wherein a focal length of the receiving lens is fulfilled a formula as follows:

$(D+Tw(Nw-1))/\sin(\text{axis tilting angle})$ wherein the axis tilting angle is defined between a lens axis of the second side surface of the second package body and a vertical line perpendicular to the substrate;
D is an object reflective distance between a detected object and the emitting unit;
Tw is a thickness of a window unit disposed between the detected object and the sensor, and
Nw is a refractive index of the window unit.

18. The sensor according to claim 15, wherein an axis tilting angle between a lens axis of the first side surface of the first package body and a horizontal line is between 20 to 30 degrees.

19. The sensor according to claim 15, wherein an axis tilting angle between a lens axis of the second side surface of the second package body and a vertical line is between 30 to 40 degrees.

20. The sensor according to claim 15, wherein a center of the curved part of the side emitting lens is out of the first package body.

* * * * *